Patented Nov. 14, 1922.

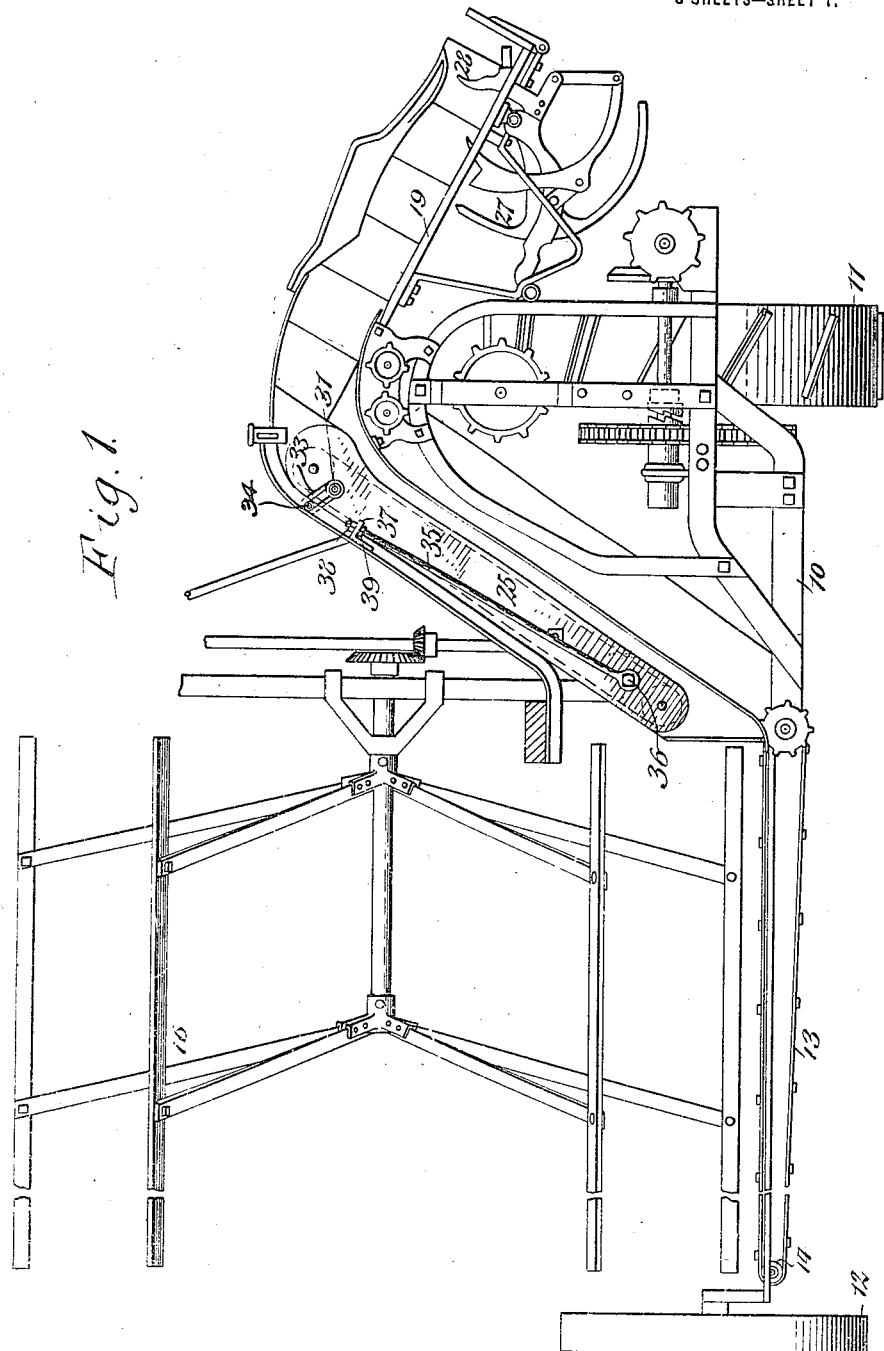

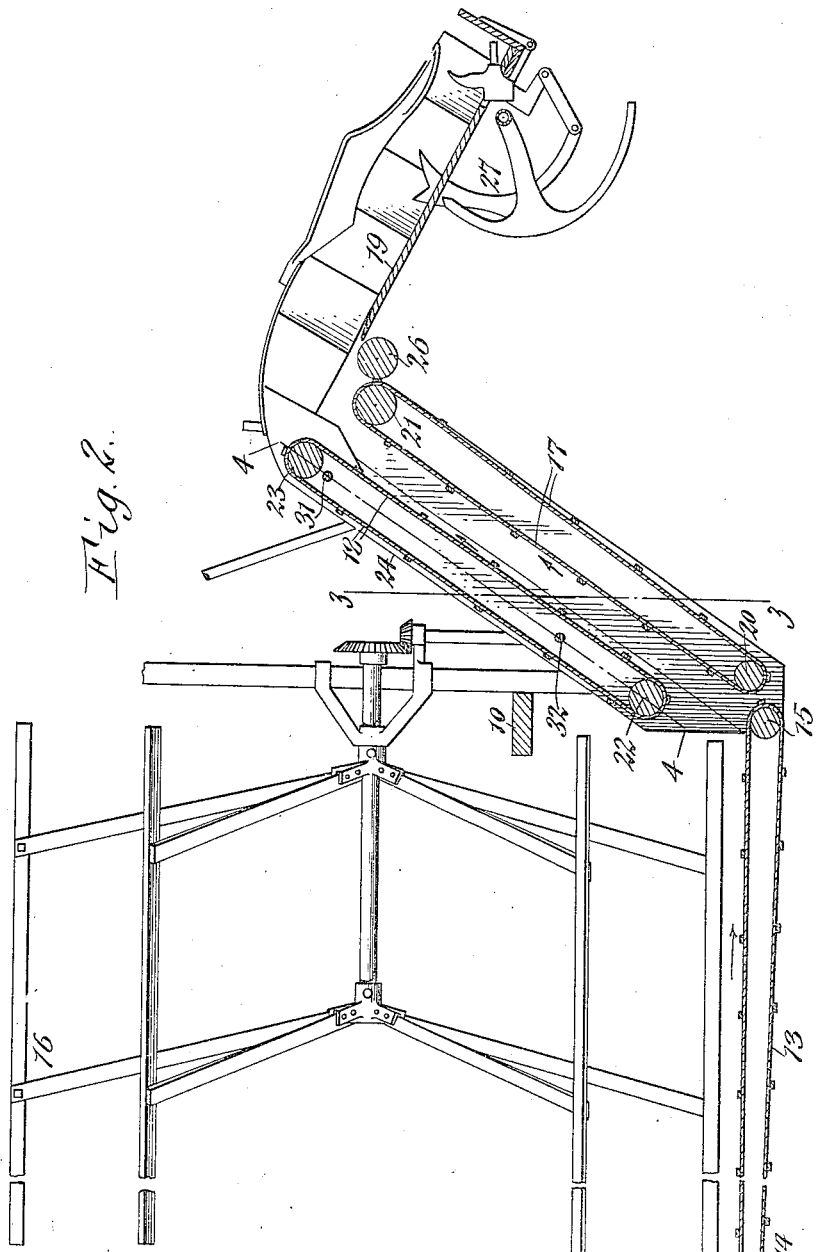

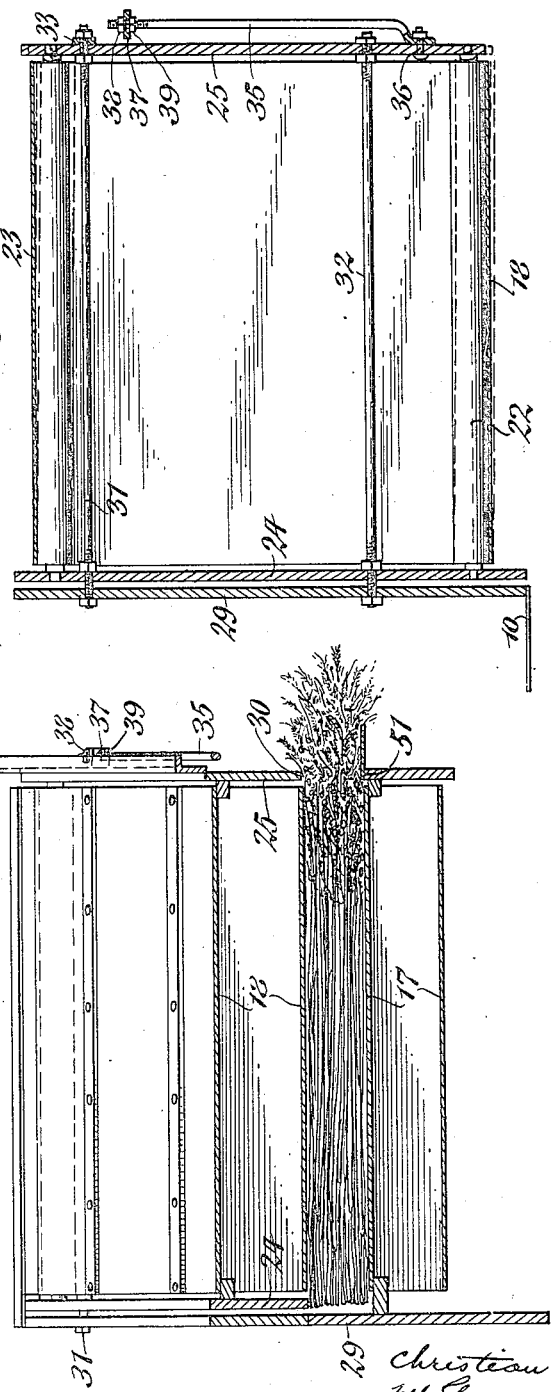

1,435,726

UNITED STATES PATENT OFFICE.

CHRISTIAN MAUL, OF BATAVIA, NEW YORK, ASSIGNOR TO MASSEY-HARRIS HARVESTER COMPANY, INC., OF BATAVIA, NEW YORK, A CORPORATION OF NEW YORK.

GRAIN HARVESTER.

Original application filed October 17, 1919, Serial No. 331,417. Divided and this application filed September 28, 1920. Serial No. 413,311.

*To all whom it may concern:*

Be it known that I, CHRISTIAN MAUL, a citizen of the United States, residing at Batavia, in the county of Genesee and State of New York, have invented new and useful Improvements in Grain Harvesters, of which the following is a specification.

This invention relates to a grain harvester and more particularly to the means for adjusting the upper elevator apron or belt, so that the same runs parallel with the companion lower elevator belt.

The object of this invention is to provide simple and efficient means whereby the upper elevator apron may be adjusted without taking off the apron or otherwise partly dismantling the machine, thus saving time and labor and avoiding undue interruption in the operation of the machine.

This application is a division of an application filed by myself October 17, 1919, Serial Number 331,417.

In the accompanying drawings:

Figure 1 is a rear elevation, partly in section, of a grain harvester embodying my improvements. Figure 2 is a fragmentary vertical longitudinal section of the machine. Figures 3 and 4 are fragmentary vertical sections taken on the correspondingly numbered lines in Fig. 2.

Similar characters of reference indicate corresponding parts throughout the several views.

10 represents the main frame of the harvester which may be of any suitable construction to support the several working parts and which is supported on the stubbleward side by a master wheel 11 and on the grainward side by a supporting wheel 12.

On the grainward end of the frame is arranged a horizontal conveyer which receives the grain from the cutter mechanism and delivers the same to the elevator, whereby the grain is elevated over the master wheel and presented to the binder mechanism which ties bands around bundles of grain. This horizontal conveyer is of usual and well known form and preferably comprises a canvas apron or belt 13 which passes at its grainward and stubbleward turns around supporting rollers 14, 15 journaled on the main frame. This horizontal conveyer moves with its upper operative stretch from the grainward side toward the stubbleward side of the machine and the grain is directed upon the same from the cutter mechanism by the usual rotary reel 16.

The elevator comprises lower and upper inclined canvas aprons or belts 17, 18, which extend upwardly at an angle from the delivery turn of the horizontal conveyer to the upper or receiving end of the downwardly-inclined binder deck 19. The lower elevator apron passes with its lower and upper turns around horizontal receiving and delivery rollers 20, 21, which are journaled transversely on the lower and upper parts of the main frame, this apron being operated to move upwardly with its upper stretch. The upper elevator apron passes with its lower and upper turns around horizontal receiving and delivery rollers 22, 23 which are journaled transversely in two supporting bars or plates 24, 25, arranged transversely and in an inclined position relatively to the main frame at the front and rear sides of the elevator. The lower stretch of the upper apron moves upwardly, so that the grain discharged from the horizontal conveyer will be received between the opposing stretches of the two elevator aprons and carried upwardly to the binder deck. In passing from the elevator aprons to the deck the grain is engaged by an intermediate clearing roller 26 which is journaled horizontally and transversely on the main frame in the gap between the elevator and the deck.

As the grain slides down the binder deck the same is received between the needle 27 and the knotter 28 of the bundling and tying mechanism which is arranged adjacent to the lower part of the deck and which may be of any suitable construction to tie bands around the bundles of grain which is being harvested.

The space or passageway between the elevator aprons is closed on the front side of this space by the adjacent wall 29 which is mounted on the main frame and which faces the butt ends of the grain, as shown in Figs. 3 and 4, while the rear side of this space or passageway is open and forms a gap or throat 30 through which the heads of the grain of varying length project rearwardly therefrom. This necessitates mounting the rollers of the upper elevator apron on a rearwardly overhanging supplemental frame which is supported at its front side on the main frame. In its preferred form this overhanging frame comprises the two longitudinal side plates or bars 24, 25, which are arranged at the front and rear sides of the elevator and on which the rollers of the upper apron are journaled and two horizontal tie rods 31, 32 passing transversely through the lower and upper ends of the side plates and connecting the same with each other and with the adjacent front wall 29 of the inclined grain passage.

Owing to the overhang of the supplemental frame, means are provided for adjusting the same in a plane parallel with the path of the grain through the elevator in order to maintain the rollers of the upper elevator apron parallel with those of the lower apron and cause the upper apron to run properly and most efficiently. For this purpose the rear end of the overhanging supplemental frame is adjustably connected with the adjacent part of the main frame as follows:

33 represents an upright link which is engaged at its upper end with a pin 34 on the upper part of the main frame, while its lower end engages with a projection on the upper part of the rear plate 25 of the supplemental frame, which projection may consist of the upper tie rod 31, as shown in Figs. 1 and 4 of the drawings, although a separate projection may be employed if desired. This connection between the main frame and the rear part of the supplemental frame permits the upper elevator apron and associated parts to rise and fall in adapting itself to variations in the thickness of the mass of grain which is being harvested and also permits the rear end of the supplemental frame to be freely adjusted parallel with the path of the grain through the elevator for obtaining proper running of the upper elevator apron.

The preferred means for effecting this adjustment of the supplemental frame comprises a shifting rod 35 arranged lengthwise of the rear plate 25 of the supplemental frame and connected at its lower end with this frame by a pin 36, as shown in Fig. 1, or by other suitable means, a perforated bracket 37 secured to the upper part of the main frame and receiving the upper end of said shifting rod, and screw nuts 38, 39 applied to the threaded upper end of said rod and engaging with the opposite sides of the bracket 37. Upon loosening one of the screw nuts 38, 39, and tightening the other, the shifting rod and the rear part of the supplemental frame are moved up or down parallel with the path of the grain through the elevator. By this means the upper elevator apron can be adjusted so that the same runs true to the lower elevator apron while the machine is running and without requiring the operator to reach into the interior of the machine or taking off any of the canvas aprons, inasmuch as the adjusting devices for this purpose are on the exterior of the machine. This adjustment of the rear part 25 of the supplemental frame is permissible by reason of the fact that the same is movably connected with the relatively stationary front part 24 of this frame by the rods 31, 32 and other connections which yield sufficiently to enable the rear plate 25 and the bearings therein for the rollers 22, 23 to be adjusted as may be necessary. In Fig. 4 the two rollers of the upper elevator apron are represented by dotted lines in a position in which the supplemental frame has sagged out of its normal position while the full lines show the same restored to the proper position by the adjusting device.

I claim as my invention:

1. A harvester, comprising a main frame, an inclined elevator having a supplemental frame which is supported at its front side on the main frame and has its rear side arranged underneath a part of said main frame, and means for adjusting said supplemental frame parallel with the direction in which the material is propelled by said elevator comprising a shifting rod arranged lengthwise of the direction in which the material is moved by the elevator and connected at its lower end with the lower end of said supplemental frame on the rear side of the same, a bracket arranged on the upper end of the main frame above the supplemental frame, and screw nuts arranged on the upper end of said rod and engaging opposite sides of said bracket.

2. A harvester comprising a main frame, an elevator having a supplemental frame which is supported on one side on said main frame, and a guide link connected at its upper and lower ends with said main and supplemental frames and capable of swinging lengthwise of the latter and permitting the same to rise and fall and also move lengthwise of the direction in which the material is propelled by said elevator.

CHRISTIAN MAUL